United States Patent
Forstall et al.

(10) Patent No.: US 8,538,462 B2
(45) Date of Patent: Sep. 17, 2013

(54) SYNCHRONIZING MOBILE AND VEHICLE DEVICES

(71) Applicant: Apple Inc., Cupertino, CA (US)

(72) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/681,114

(22) Filed: Nov. 19, 2012

(65) Prior Publication Data

US 2013/0143596 A1  Jun. 6, 2013

Related U.S. Application Data

(63) Continuation of application No. 13/471,104, filed on May 14, 2012, now Pat. No. 8,340,694, which is a continuation of application No. 12/035,610, filed on Feb. 22, 2008, now Pat. No. 8,180,379.

(60) Provisional application No. 60/946,792, filed on Jun. 28, 2007.

(51) Int. Cl.
*H04W 24/00* (2009.01)
*H04M 3/42* (2006.01)
*H04M 1/00* (2006.01)

(52) U.S. Cl.
USPC ............... 455/456.3; 455/457; 455/414.1; 455/569.2; 701/472

(58) Field of Classification Search
USPC .......... 455/414.1, 414.2, 414.3, 456.1, 456.2, 455/456.3, 456.5, 456.6, 457, 569.1, 569.2; 701/468, 472, 494, 495, 507
See application file for complete search history.

(56) References Cited

U.S. PATENT DOCUMENTS

| | | | |
|---|---|---|---|
| 6,484,093 B1 * | 11/2002 | Ito et al. | 701/420 |
| 8,090,388 B1 * | 1/2012 | Opitz | 455/456.5 |
| 2002/0102992 A1 * | 8/2002 | Koorapaty et al. | 455/456 |
| 2002/0115436 A1 * | 8/2002 | Howell et al. | 455/426 |
| 2002/0164996 A1 * | 11/2002 | Dorenbosch | 455/456 |
| 2003/0225515 A1 * | 12/2003 | Havlark et al. | 701/213 |
| 2006/0240848 A1 * | 10/2006 | McMahan et al. | 455/456.6 |
| 2007/0219718 A1 * | 9/2007 | Pennock et al. | 701/211 |
| 2008/0194273 A1 * | 8/2008 | Kansal et al. | 455/456.3 |
| 2008/0249983 A1 * | 10/2008 | Meisels et al. | 707/3 |
| 2008/0297409 A1 * | 12/2008 | Klassen et al. | 342/357.06 |
| 2010/0121878 A1 * | 5/2010 | Lamont et al. | 707/769 |

* cited by examiner

*Primary Examiner* — Christopher M Brandt
(74) *Attorney, Agent, or Firm* — Fish & Richardson P.C.

(57) ABSTRACT

Location information is received at a mobile device from the memory of a vehicle device. The mobile device is updated based on the location information. Sensor data is received from at least one sensor measuring movement of the mobile device, and an estimated location of the mobile device is calculated based at least in part on the location information and the sensor data.

18 Claims, 8 Drawing Sheets

SYNCHRONIZING MOBILE AND VEHICLE DEVICES

CROSS-REFERENCE TO RELATED APPLICATIONS

This application is a continuation of U.S. patent application Ser. No. 13/471,104, filed on May 14, 2012, which is a continuation of U.S. patent application Ser. No. 12/035,610, filed on Feb. 22, 2008, U.S. Pat. No. 8,180,379, granted on May 15, 2012, which claims priority benefit of U.S. Provisional Patent Ser. No. 60/946,792, filed on Jun. 28, 2007, all of the contents of which are hereby incorporated by reference their entirety.

RELATED APPLICATION

This application claims a benefit of priority from U.S. patent application Ser. No. 12/035,610, titled "Synchronizing Mobile and Vehicle Devices", filed Feb. 22, 2008 which also claims priority benefit of U.S. Provisional Patent Application No. 60/946,792, titled "Synchronizing Mobile and Vehicle Devices," filed Jun. 28, 2007, all of which are incorporated by reference herein in their entirety.

FIELD OF THE INVENTION

The present invention relates generally to mobile devices.

BACKGROUND

The role of traditional printed maps is being supplanted by modern devices capable of rendering dynamic map displays. Devices that include mapping or navigation applications provide information regarding an area selected by a user by recalling map data from local memory or networked services.

Mapping devices include appropriately configured personal computers as well as dedicated mobile devices, including those found in automobiles, aircraft, and watercraft. Newer mobile devices may integrate mapping features with one or more other functions previously found only in stand alone devices, such as computing functions, personal data assistants, cellular telephone service, network access, camera functions, and the ability to play media files and games.

Mapping devices often include the ability to provide directions from a point of origin to a destination. When coupled with any of a number of positioning technologies, a mapping device can display a current position on a map as well as deliver navigation instructions based on the current position to route a user to a desired destination. Positioning technologies include satellite positioning systems such as GPS, information from nearby cellular base stations, information from other mapping devices, and information from other transmitters, such as IEEE 802.x or Bluetooth™ transmitters, having known locations.

SUMMARY

According to one aspect, there is disclosed a computer-implemented method. The method includes receiving, at a mobile device, location information stored in a memory of a vehicle device, and updating a mobile device based on the location information, where the mobile device is proximate to the location of the vehicle device. The method also includes receiving sensor data from at least one sensor measuring movement of the mobile device, and calculating an estimated location of the mobile device based at least in part on the location information and the sensor data.

One or more of the following features may also be included. The vehicle device can include a GPS system and/or a GPS receiver. The at least one sensor can be located within the mobile device, and can be an accelerometer, gyro, and/or compass. Additionally, the mobile device can be in communication with the vehicle device during the updating of the mobile device. The mobile device can be in communication with the vehicle device via a wireless communication and/or via a communication link. Additionally, the location information can include the current location of the vehicle device, the location of a desired destination, the location of an object, or navigation information.

According to another aspect, there is disclosed a computer-implemented method. The method includes transmitting to a vehicle device location information stored in a memory of a mobile device, and updating the vehicle device based on the location information, where the mobile device is proximate to the location of the vehicle device, and where the location information is accessible to a user via at least one interface with the vehicle device.

One or more of the following features may also be included. The vehicle device can include a GPS system and/or a GPS receiver. The method can also include comparing the location information to vehicle device data prior to updating the vehicle device based on the location information. Furthermore, updating the vehicle device based on the location information may occur after a determination that the location information does not exist in the vehicle device data. The mobile device can be in communication with the vehicle device via a wireless communication and/or via a communication link. Additionally, the location information can include the identity of an object, the identity of a geographical location, the geographical location of a desired destination, the geographical location of an object, or navigation information.

According to yet another aspect, there is disclosed a computer-implemented method that includes transmitting to a vehicle device contact information stored in a memory of a mobile device, and updating the vehicle device based on the contact information, where the mobile device is proximate to the location of the vehicle device, and where the contact information is accessible to a user via at least one interface with the vehicle device.

According to a feature, the contact information can include a telephone number, an address, a name, and/or an email address.

According to another aspect, there is disclosed a portable electronic device. The device includes a touch sensitive display, one or more processors, a memory, a motion sensor, and a program. The program is stored in the memory and configured to be executed by the one or more processors, and the program includes instructions for calculating an estimated current location of the device, the calculation being based at least in part on location information provided by a vehicle device and received sensor data from at least one sensor of the portable electronic device.

According to yet another aspect, there is disclosed a method of coupling a first device to a second device, where the first device is proximate to the second device, updating the first device with location information from the second device, and calculating an estimated location of the first device based at least in part on the location information from the second device. The second device can also be updated with location information received from the first device.

BRIEF DESCRIPTION OF THE DRAWINGS

Like reference numerals refer to corresponding parts throughout the drawings.

DETAILED DESCRIPTION

Figure 1:
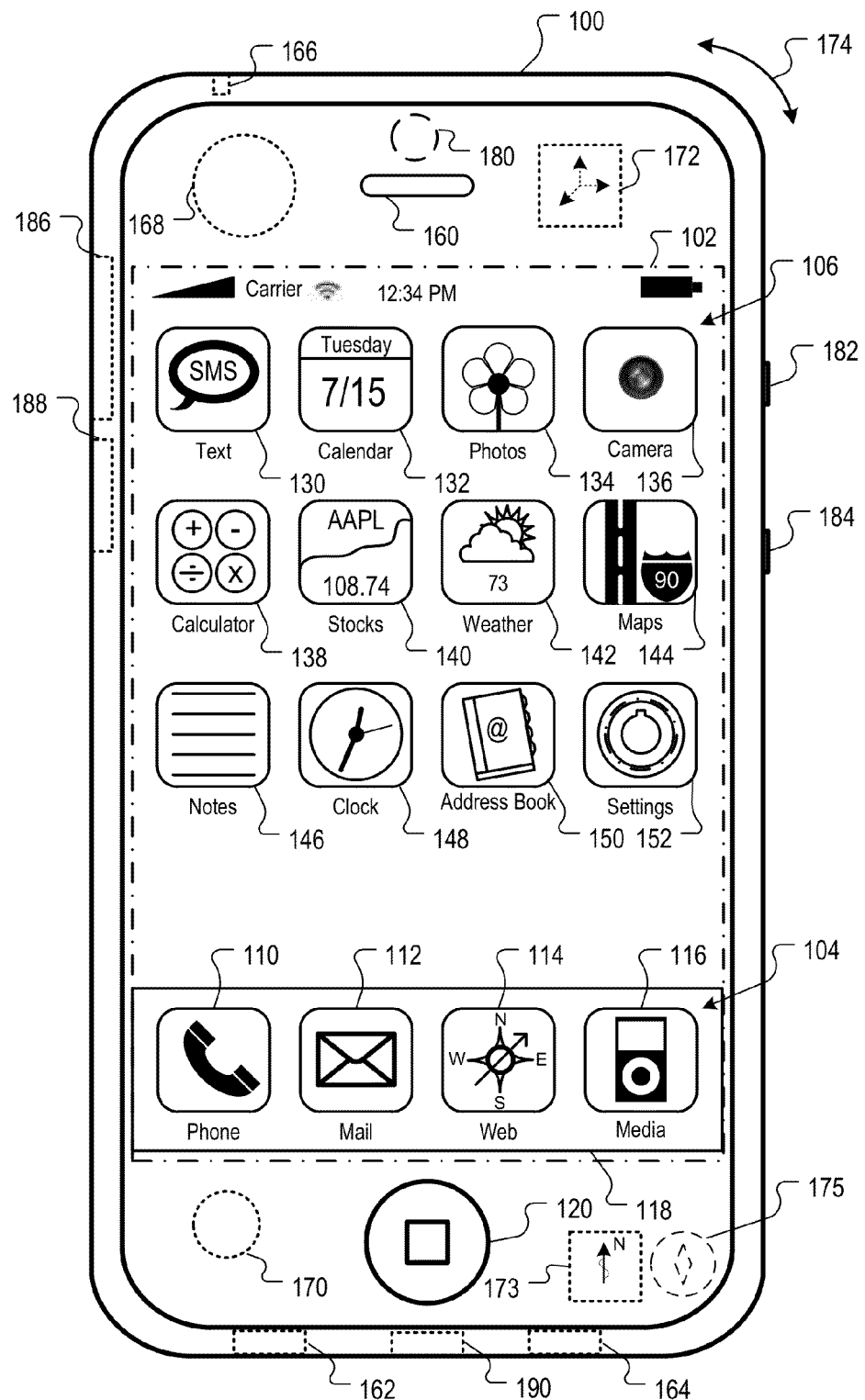
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate handsfree voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, one or more of an accelerometer 172, a compass 173, and a gyroscope 175 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, GPS systems and/or receivers, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
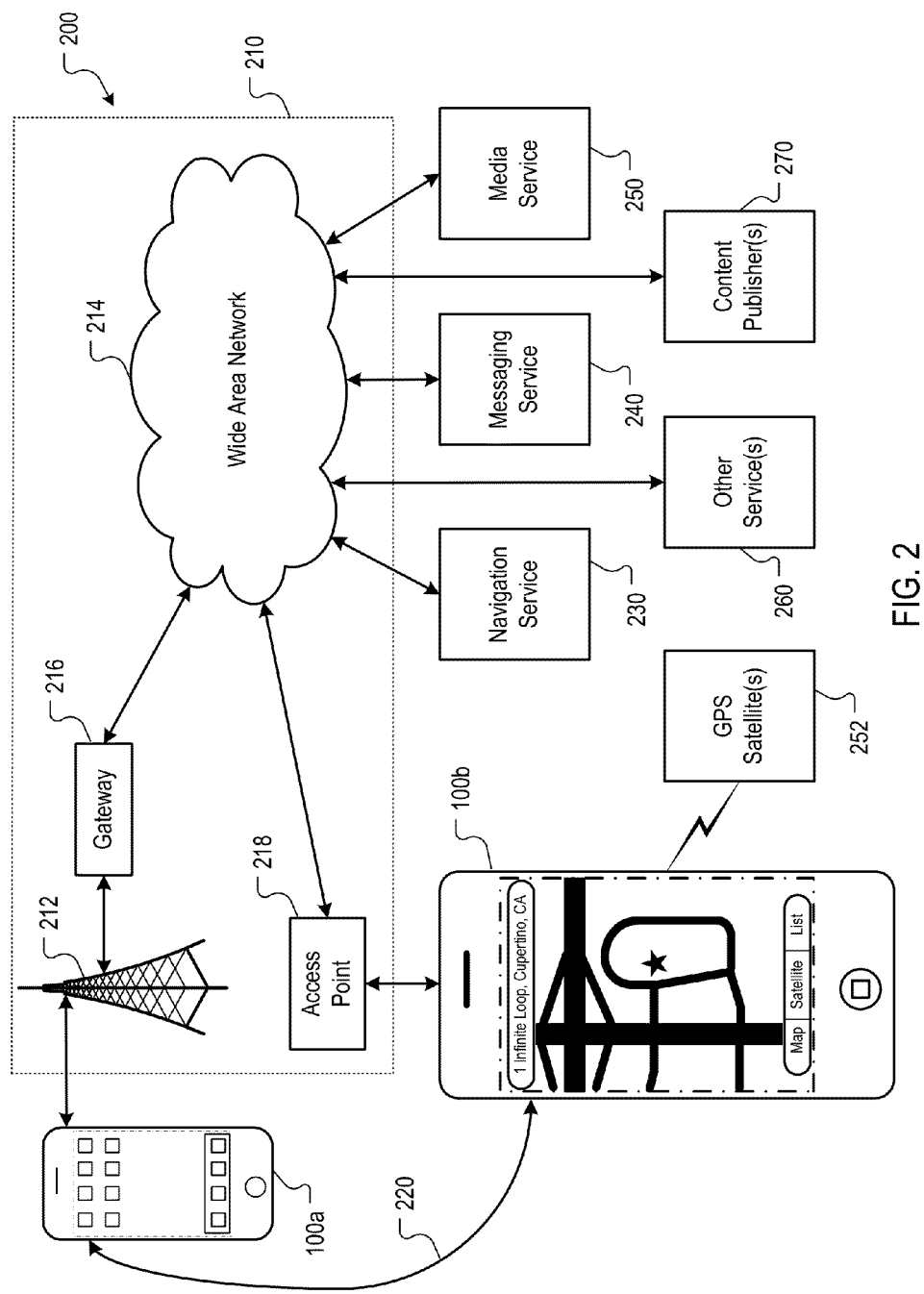
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access device, can provide communication access to the wide area network 214. In some implementations, both voice and data communications can be established over the wireless network 212 and the access device 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access device 218 and the wide area network 214. In some implementations, the mobile device 100 can be physically connected to the access device 218 using one or more cables and the access device 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

The mobile device 100 can also communicate with one or more GPS Satellite(s) 252 to enable circuitry and sensors (e.g., a GPS receiver on the mobile device 100) to support a location determining capability.

Example Mobile Device Architecture

Figure 3:
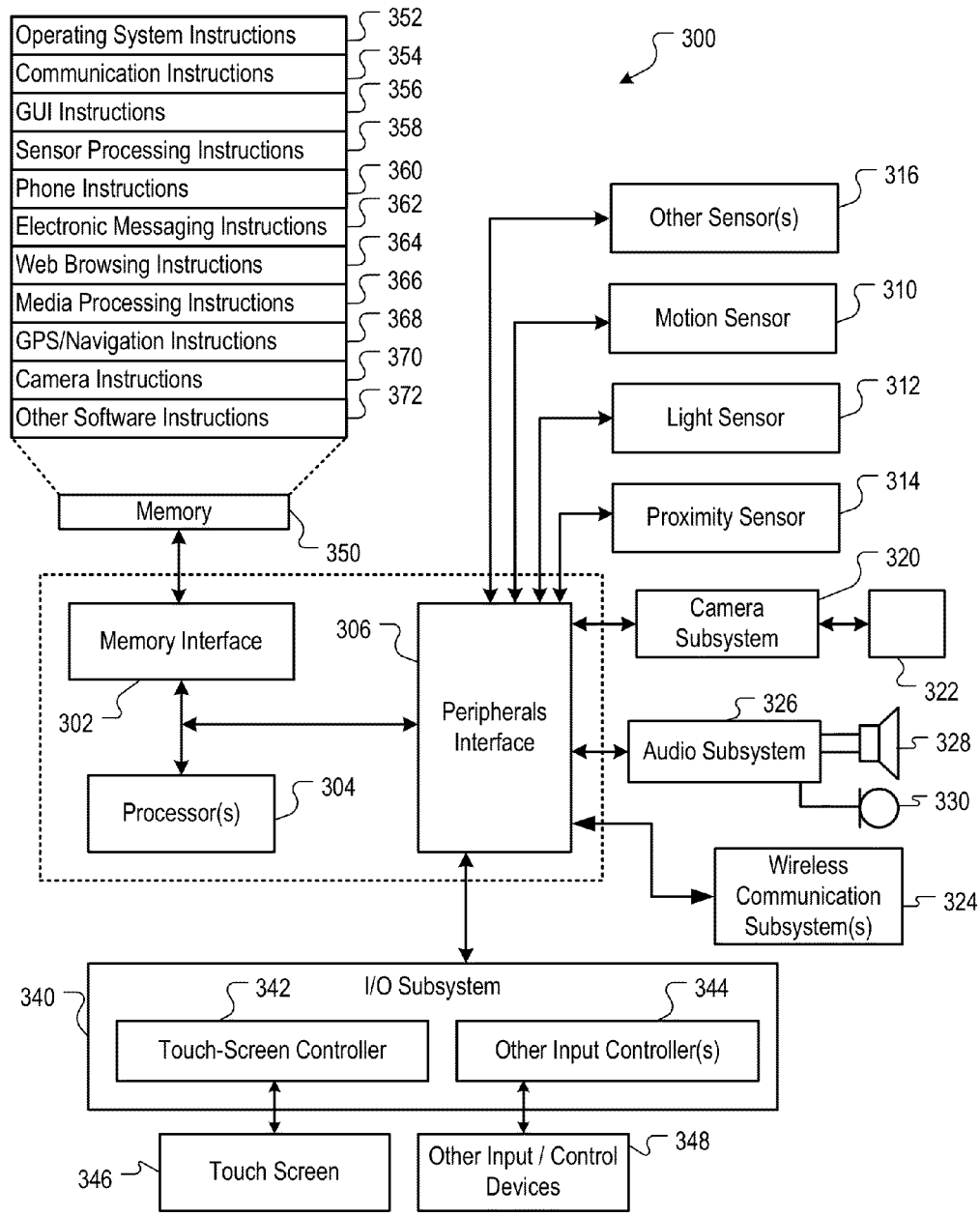
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to one or more speakers 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system, such as Darwin, RTXC, LINUX, UNIX, OS X, WINDOWS, or an embedded operating system such as VxWorks. The operating system may include instructions 352 for handling basic system services and for performing hardware dependent tasks. In some implementations, the operating system can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other related processes and functions (e.g., security processes, activation record).

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Integrated Map/Address Book Feature

In one implementation, the mobile device 100 is location aware (i.e., can determine its current location). The user of the mobile device 100 can select the map display object 144 to invoke a map application. The map application provides a display of a map on a display (e.g., the touch sensitive display 102), where the map is approximately centered, for example, about the current location of the mobile device 100. By way of example, the map application can be Google Maps API provided by Google, Inc. of Mountain View, Calif., although other map applications can be used.

The user of the mobile device can select the address book display object 150 to invoke an address book application. The address book includes information corresponding to a set of contacts selected by the user. For example, the contact information can include a person or entity's name, address, phone number, e-mail address, and/or other information related to the person or entity. The address book can be stored within the mobile device 100, or stored externally and accessible by the mobile device 100.

Referring again to FIG. 3, in this implementation, the mobile device 100 includes a positioning system 318. In various implementations, the positioning system 318 can be provided by a separate device coupled to the mobile device 100, or can be provided internal to the mobile device. In some implementations, the positioning system 318 can employ positioning technology including a GPS, a cellular grid, URIs or any other technology for determining the geographic location of a device. In some implementations, the positioning system 318 can employ a service provided by a positioning service such as, for example, SkyHook Wireless of Boston, Mass., or Rosum Corporation of Mountain View, Calif. In other implementations, the positioning system 318 can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system 318 can be provided by using wireless signal strength and one or more locations of known wireless signal sources to provide the current location. Wireless signal sources can include access points and/or cellular towers. Other techniques to determine a current location of the mobile device 100 can be used and other configurations of the positioning system 318 are possible.

In this implementation, an integrated map/address book feature is provided. By integrating the map application and the address book application provided by the mobile device 100, graphical objects can be displayed on the map representing locations of contacts included in the user's address book. In some implementations, each time a user selects to activate the map application, the user is asked whether or not the user would like to activate the integrated map/address book feature, to which the user can respond yes to activate the feature or no to use the map application independent of the address book application. In other implementations, the user can set a default as to whether the integrated map/address book feature is always on or always off within settings included in the mobile device 100. In yet other implementations, a graphical display object can be provided to specifically activate the map application integrated with the address book application.

By employing the integrated map/address book feature, advantageously, the user is presented with immediate information about persons or entities known to the user that are within a predetermined vicinity to the current location of the mobile device 100. For example, if the user traveled to a city on vacation or for business, rather than manually scanning through the user's address book to determined which contacts were located in the city, and their relative locations to one another and to a destination of the user, the user can employ the integrated map/address book feature while present in a location in the city and be provided an immediate visual presentation of this information.

In another implementation, the user can request a map of a location other than the current location of the mobile device, and employ the integrated map/address book feature in relation to the user-specified location. That is, for example, prior to the user traveling to a city on vacation or for business, the user can input the address where he/she will be staying in the city, and employ the feature to be provided an immediate visual depiction of contact locations from the user's address book, within a predefined proximity to the user-specified location.

Example GPS and Dead-Reckoning Navigation Functionality

According to an implementation, the location of the mobile device 100 can be measured using information received from orbiting GPS satellites using a GPS receiver. The present latitude and longitude of the mobile device can be determined and shown on the display 102 with a map of the surrounding area. For example, selection of the map object 144 can present a user with a map showing the user's current location and a menu of options for manipulating the map using navigation features of the device 100.

In an implementation, the location of the device 100 can be measured based on the timing of signals to or from nearby cellular base stations. In an implementation, if the location of one or more IEEE 802.x or Bluetooth™ transmitters is known, reception of signals from these transmitters by the device 100 can be used to measure the device's current location. In another implementation, past locations of the device 100 are stored in memory 350 so that a location history or a traveled path can be displayed.

In some situations environmental factors can prevent the location of the device 100 from being determined For example, GPS reception is often not possible unless a line of sight can be established between the GPS receiver and the number of satellites needed to compute the receiver's location. In addition, determining position using terrestrial radio waves might not be possible near sources of radio frequency interference or in areas where multiple time delayed versions of a transmission are created due to reflections off of surrounding structures.

In an implementation, the device 100 includes one or more of: an accelerometer 172, a magnetic compass 173, and a gyro 175. The accelerometer 172, compass 173, and gyro 175 can be used alone or in combination to measure movements of the device 100. Additional sensors can be located external to the device 100, for example, on the person of the user. For example, any, some, or all of an accelerometer, a compass, a gyro, and an impact sensor can be located on or in the user's footwear. An impact sensor detects footwear contact with the ground, facilitating the measurement of a number of steps. A distance traveled can be estimated using the product of the average length of a user's stride and a number of steps taken. Alternatively contact with the ground during walking can be measured using an accelerometer that detects the change in velocity of a shoe as it contacts the ground. The sensors can be located on or in one or both of the user's shoes. The external sensors can send information to the device 100 via a wireless link. The length of the user's stride can be set and stored in device memory.

Information from accelerometers, a compass, gyros, and impact sensors can be used alone or in combination to, for example, measure the movement of the device 100 from a point of origin or known location (a "fix") to determine the device's location relative to the fix. Location measurement techniques of this type are generally referred to as "dead reckoning". Dead reckoning can be used in conjunction with other location measurement techniques such as GPS, and used in cases where no satellite or terrestrial positioning signal information is available (whether the unavailability is due to interference in the operating environment or the lack or reception capabilities in the device).

Dead reckoning position measurement is error prone, and small errors in measuring a turn, for example, can lead to large errors later if a new fix is not obtained before a lengthy distance is traversed. Frequently updated fixes improve the accuracy of a location shown, for example, on a moving map display of the mobile device 100 measured using dead reckoning. In an implementation, the device 100 is configured to switch into a dead reckoning positioning mode upon another positioning mode becoming unavailable.

Example Communication With Vehicle Device(s)

Figure 4:
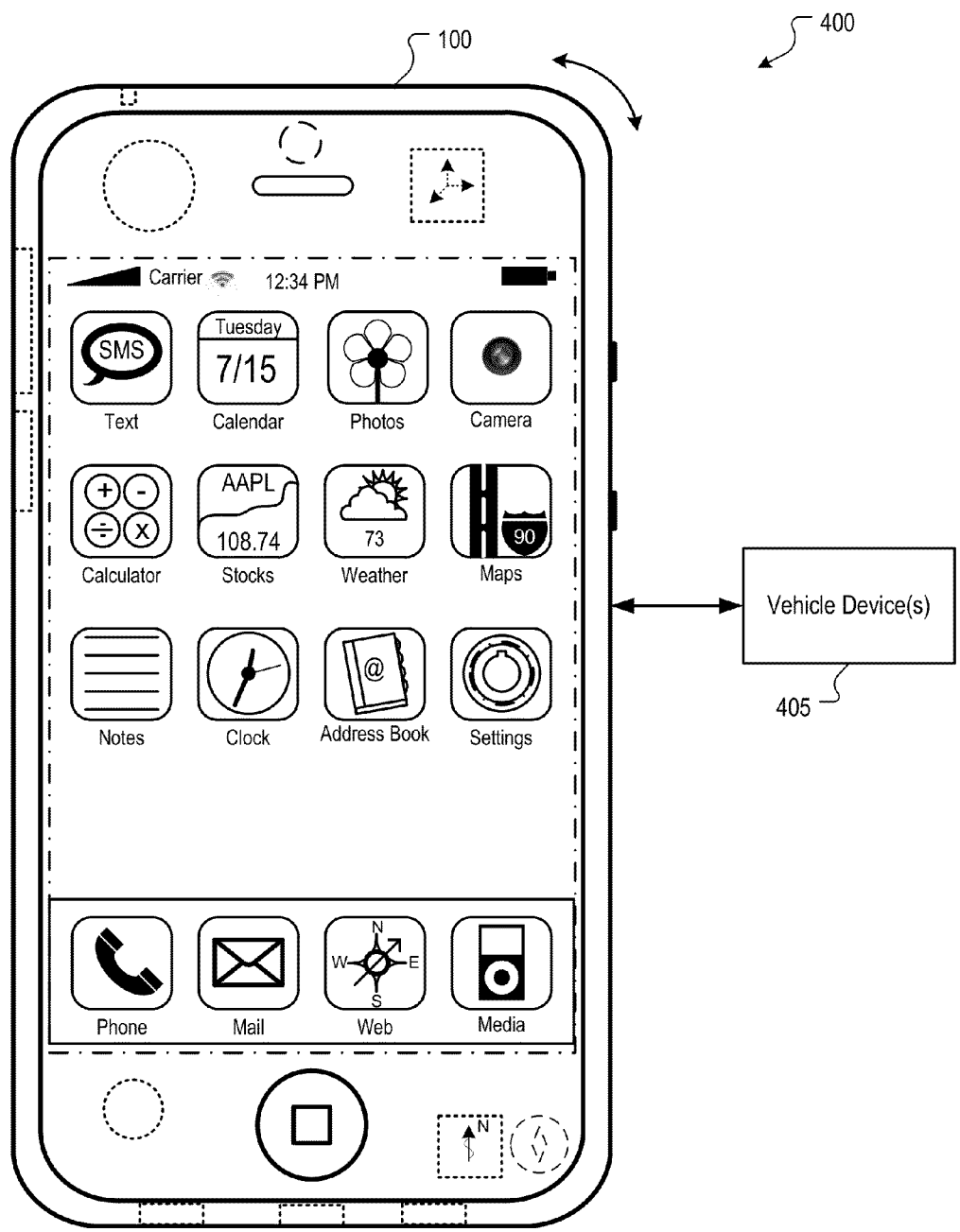
FIG. 4 is an example system including an example implementation of the mobile device of FIG. 1.

FIG. 4 is a block diagram of an example system 400 including an example implementation of the mobile device 100 of FIG. 1. In an implementation, the mobile device 100 includes an integrated GPS receiver. Alternatively, or in addition, the mobile device 100 can accept a GPS receiver as an accessory.

The example system 400 includes one or more vehicle devices 405 in communication with the mobile device 100. According to an implementation, the vehicle device(s) 405 can be removably connected to the mobile device 100 via the other input/control devices 348. The vehicle device(s) 405 can include a GPS system and/or GPS receiver illustrated in FIG. 4 as external to the mobile device 100. As an example, the one or more vehicle device(s) 405 can be a GPS system located within an automobile, which the mobile device 100 may communicate with via a connection (e.g., a removable connection, a wired connection or wireless connection) via the other input/control devices 348. Communication with the vehicle device(s), which in some implementations may operate as an accessory GPS receiver, can occur via a wired connection such as a USB connection, a compact flash interface, secure digital interface, or other wired connection types.

According to an implementation, the vehicle device(s) 405 can communicate with the mobile device 100 via the wireless communication subsystem(s) 324. For example, the vehicle device(s) 405 can communicate with the mobile device 100 via a wireless connection such as IEEE 802.x, Bluetooth™, or other wireless communication formats.

According to an implementation, the device 100 is configured to communicate with the vehicle device(s) 405 to receive location information from the vehicle device(s) 405. Location information can include a current location of the vehicle device(s), the location of a desired destination, the location or identity of an object, navigation information (including routes), address information, configuration settings, historical route information, traffic information, and the like.

According to an implementation, the mobile device 100 can use the location information to identify the current location of the mobile device 100 even where the mobile device 100 is unable to identify its current location, for example, due to failure of the device 100 to include a GPS receiver or other means for identifying its location, or failure of the device 100 to acquire GPS signals or other location signals from IEEE 802.x, Bluetooth™ transmitters, and the like. Additionally or alternatively, the mobile device 100 can use location information provided by the vehicle device(s) 405 instead of the location of the mobile device 100 as measured, for instance, using a GPS receiver in the device 100.

According to an implementation, location information is repeatedly provided to the mobile device 100 in real-time or near real-time by the vehicle device(s) 405. The information may be retrieved from the vehicle device(s) 405 via a data retrieval request (i.e., a 'pull procedure') or may be transmitted to the mobile device 100 by the vehicle device(s) 405 automatically (i.e., a 'push procedure'). According to an implementation, the location of the mobile device 100 identified by the vehicle device(s) 405, including the present latitude and longitude of the mobile device 100, can be shown on the display 102 with a map of the surrounding area. For example, selection of the map object 144 can present a user with a map showing the current location of the mobile device 100 and a menu of options for manipulating the map using navigation features of the device 100. The location of the vehicle device(s) 405 provided to the mobile device 100 provides an accurate estimate for the location of the mobile device 100 because the mobile device 100 is typically proximate to the vehicle device(s) 405. For instance, the mobile device 100 may be docked and communicate with a GPS system inside of a automobile.

According to an implementation, location information may be received from the vehicle device(s) 405 and stored in the mobile device 100 for use by a user when the mobile device 100 is no longer in communication with the vehicle device(s) 405. For instance, location information received from the vehicle device(s) 405 may be used for street navigation by a user. For example, even where the mobile device 100 does not include a GPS receiver (or GPS signals are unavailable), the mobile device 100 can use the last known location, as provided by the location information provided by the vehicle device(s) 405, as a starting point for dead-reckoning navigation, which can use dead reckoning position measurements to estimate a current location of the device 100 as the device moves. In an implementation, the device 100 can be automatically configured to switch into a dead reckoning positioning mode when undocked from (i.e., no longer in communication with) a vehicle device(s) 405 if the device does not include a GPS receiver (or GPS signals are unavailable). According to another example, a user can utilize location information, such as the location of a desired destination or sites of interest, provided to the mobile device 100 from the vehicle device(s) 405 after departing a vehicle.

According to an implementation, the vehicle device(s) 405 can store and/or identify information in addition to (or alternatively to) location information. For instance, the vehicle device(s) 405 can include vehicle navigation systems, vehicle audio systems, telecommunication systems or interfaces, vehicle computers, and the like. The device 100 can be configured to receive any information identified and/or stored by vehicle device(s) 405. For instance, vehicle diagnostics (e.g., fluid levels, maintenance schedules, problems, etc.), music or other media files, contact information, and the like, may be transmitted from the vehicle device(s) 405 to the mobile device 100. Other information that may be provided to the device 100 from the vehicle device(s) can include vehicle data including energy consumption, average miles per gallon, time of use, average speed, high speed, percentage of time running on an electric power source, route information, maintenance schedules, and the like. According to an implementation, one or more other software instructions 372 can include instructions for interfacing with one or more vehicle device(s) 405. According to an implementation, the one or more other software instructions 372 can include vehicle diagnostic algorithms to retrieve vehicle diagnostics for storing in the mobile device 100.

According to another implementation, the mobile device 100 is operable to update the vehicle device(s) with any information identified and/or stored by the device 100. For instance, the mobile device 100 can update the vehicle device(s) with location information, including its current location, the location of a desired destination, the location or identity of an object, navigation information (including routes), address information, configuration settings, historical route information, traffic information, other information corresponding to points of interest, and the like. For example, using the mobile device 100 a user may identify a particular destination, such as a store or restaurant, and save that destination (e.g., the identity of the destination) using one or more interfaces of the mobile device 100. When the device 100 is in communication with the vehicle device(s) 405 the device 100 can update the vehicle device(s) 405 with the information. The vehicle device(s) 405 can then use the information to provide instructions (e.g., driving directions) to a user to reach the desired destination.

The mobile device 100 may store map information and provide the map information to the vehicle device(s). In some implementations this may occur via updating of one or more vehicle device databases. For instance, the mobile device 100 may be used to provide a vehicle GPS system or device with updated map information. This can include, for instance, updates to road locations, location of objects, telephone numbers, object names, and other information typically used by GPS systems. According to another implementation, contact information stored in the device 100 can be communicated to vehicle device(s). Contact information can include one or more telephone numbers, addresses, names, email addresses, and the like. For instance, a vehicle telecommunication system could use contact information provided by the mobile device 100 to populate address book entries which a user can reference or use to place a call. The mobile device can provide other data to vehicle device(s), including vehicle software updates.

Figure 5:
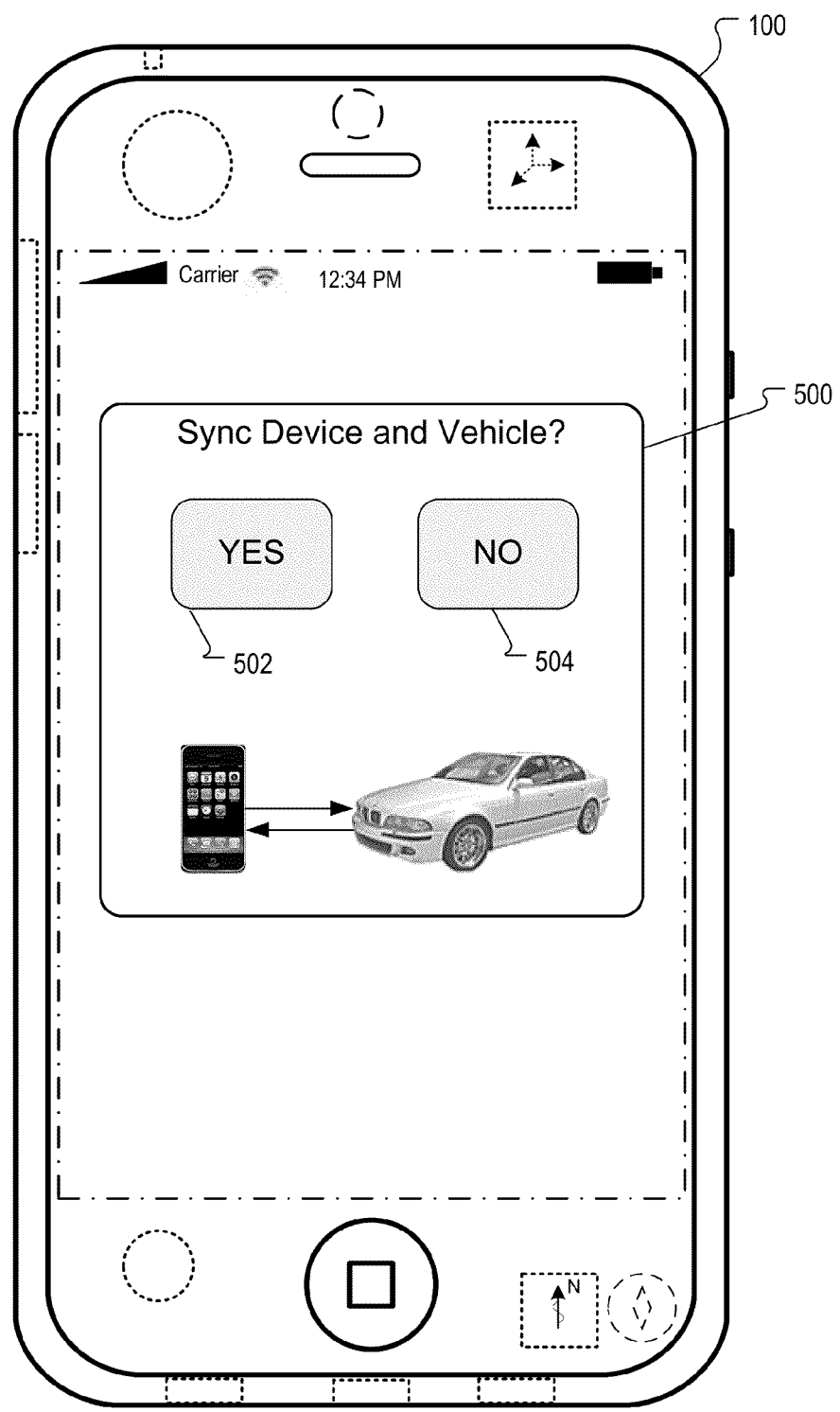
FIG. 5 is an example synchronization request screen of the mobile device of FIG. 1.

FIG. 5 is a block diagram of an example synchronization request screen 500 of the mobile device of FIG. 1. In an implementation, the request screen 500 can appear after the mobile device 100 is in communication with the vehicle device(s) 405. This can occur after the mobile device 100 is docked or physically connected to the vehicle device(s) 405, or after wireless communication between the two devices is established.

The synchronization request screen 500 includes two user selectable touch-sensitive display buttons 502, 504 that permit a user to accept or deny synchronization between the mobile device 100 and vehicle device(s) 405. If the user accepts synchronization, the mobile device 100 and vehicle device(s) 405 are synchronized according to synchronization settings established by the user using the synchronization settings screen described with respect to FIG. 6, below. If the user does not accept synchronization, the mobile device 100 and vehicle device(s) 405 will not communicate with each other. According to an implementation, the user may not be prompted to accept or deny synchronization. According to an implementation, the user may configure whether synchronization will occur automatically without user input.

Figure 6:
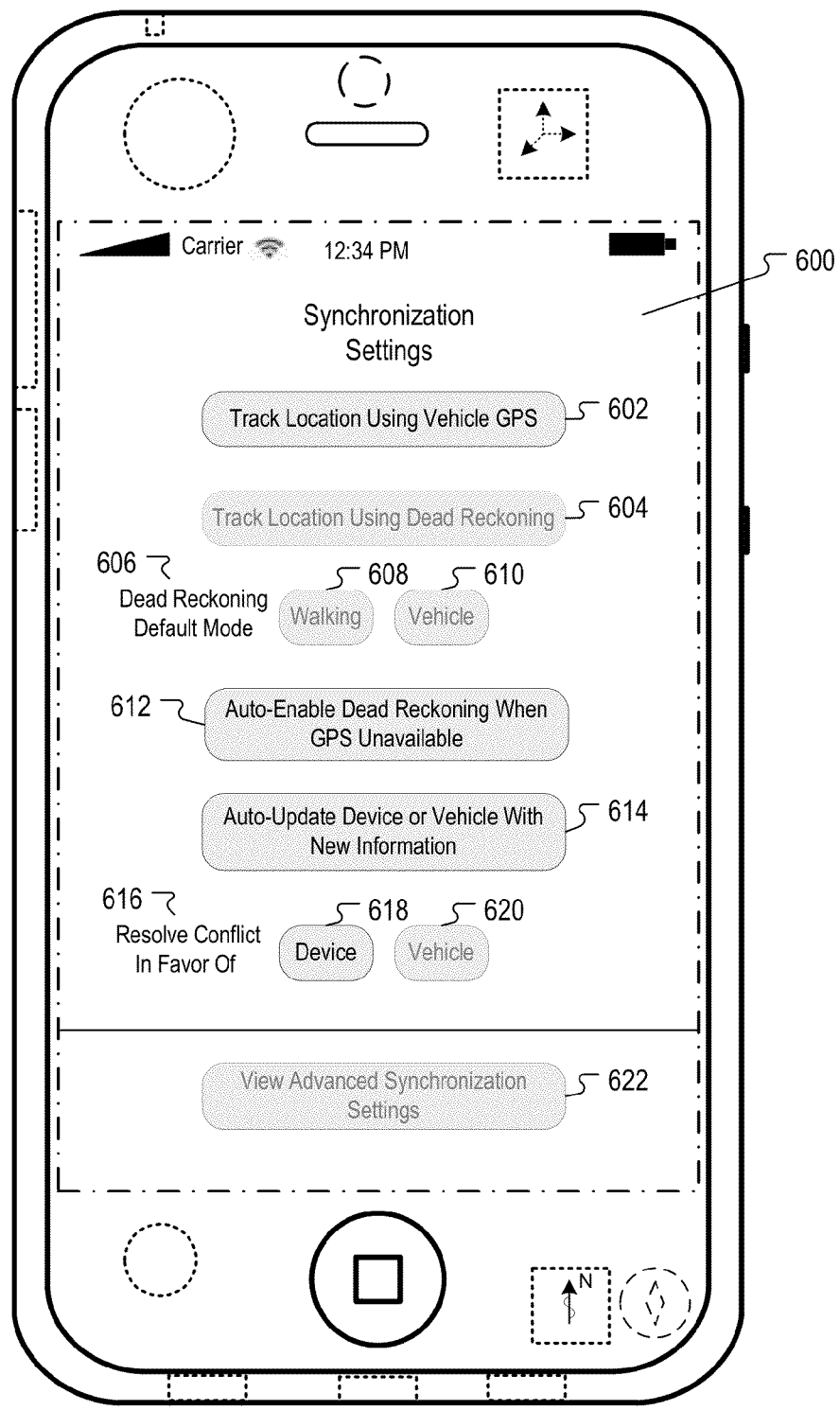
FIG. 6 is an example synchronization settings screen of the mobile device of FIG. 1.

FIG. 6 is a block diagram of an example synchronization settings screen 600 of the mobile device of FIG. 1. The screen 600 includes user selectable touch-sensitive display buttons 602, 604, 606, 608, 610, 612, 614, 616, 618, 620, 622 that allow a user to toggle synchronization settings on or off. Touching the button toggles the buttons between an active or enabled state, and a disabled state. When a button is in a disabled state its appearance changes to a lighter or "grayed out" appearance.

The "track location using vehicle GPS" button 602 is shown in an enabled state. In an implementation, enabling this function causes the mobile device 100 to receive location information from the vehicle device(s) 405. This button will appear as "grayed out" and unavailable for a user selection is location information is inaccessible from the vehicle device(s) 405. When the "track location using vehicle GPS" button 602 is selected, the "track location using dead-reckoning" button 604, "walking" button 608, and "vehicle" button 610 toggle to a disabled state. Selection of the "track location using dead-reckoning" button 604 causes the "track location using vehicle GPS" to toggle to a disabled state, and causes the device to use dead-reckoning to identify the current location of the device 100. Dead-reckoning uses the last known location of the device as a starting point for estimating a location of the device 100.

A dead-reckoning default mode selection 606 is shown. The "vehicle mode" button 610 and "walking mode" button 608 are accessible when the "track location using dead-reckoning" button 604 is enabled. Both are shown in disabled states. When the "track location using dead-reckoning" button 604 is enabled, a touch of the "walking mode" button 608 would cause a walking mode to become enabled, which, in turn, causes the "vehicle mode" button 610 to toggle to the disabled representation. When the "track location using dead-reckoning" button 604 is enabled, a touch of the "vehicle mode" button 610 would cause a vehicle mode to become enabled, which, in turn, causes the "walking mode" button 608 to toggle to the disabled representation.

In an implementation, a vehicle dead reckoning mode uses an accelerometer reading to determine how the device is positioned relative to the earth's gravity. That is, the accelerometer is used to detect which direction is down relative to the positioning of the device. This axis changes and measurements are updated if the device is reoriented in the vehicle. In the vehicle mode, sudden accelerations in a positive or negative direction along the axis of the earth's gravity are given a reduced importance in the dead reckoning position measurement calculation being utilized. Accelerations along this axis are discounted as they are likely caused by undulations of a traveling surface and reactions thereto by a vehicle suspension system. Accelerations along the axes perpendicular to the detected gravity axis are given enhanced weight in the vehicle mode as it is primarily these accelerations, that contribute to displacement of the vehicle from a known fix to a second position to be measured via dead reckoning and displayed on a map. In an implementation, accelerations along the axes perpendicular to the axis of gravity are compared with rotations detected by the gyroscope 175 to determine a change of direction. In an implementation, accelerations along the axes perpendicular to the axis of gravity are compared with rotations detected by the magnetic compass 173 to determine a change of direction.

In an implementation, a walking dead reckoning mode of position measurement detects an axis of periodic sudden accelerations using the accelerometer 172 and counts the periodic accelerations as steps of the user. This axis changes and measurements are updated if the device is reoriented by a user while walking. In an implementation, the device can be configured to switch to a walking mode of dead reckoning position measurement upon the detection of periodic accelerations.

In an implementation, steps are counted by contact indications detected by impact sensors of footwear of the user. If only one shoe has an impact sensor, the number of impacts can be doubled to arrive at a step count. A pedometer function can calculate the product of the user's average stride and the step count to determine a distance traversed. Accelerations in axes perpendicular to the axis of periodic acceleration are measured to determine changes in direction. In an implementation, accelerations in axes perpendicular to the axis of periodic acceleration are compared with rotations detected by the gyroscope 175 to determine a change of direction. In an implementation, accelerations in axes perpendicular to the axis of periodic acceleration are compared with rotations detected by the magnetic compass 173 to determine a change of direction. In an implementation, the walking mode combines pedometer functions with compass measurements without use of accelerometer or gyroscope data.

Referring again to the example synchronization settings screen 600, the "auto-enable dead-reckoning when GPS unavailable" button 612 is shown as enabled. In an implementation, enabling this feature causes the mobile device 100 to automatically switch to a dead-reckoning mode when GPS location information is unavailable from the vehicle device(s) 405 and mobile device 100. For example, this may occur when communication between the mobile device 100 and vehicle device(s) 405 ceases.

The "auto-update device or vehicle with new information" button 614 is shown as enabled. In an implementation, when this button is active new information stored in the mobile device 100 and/or vehicle device(s) 405 will automatically be provided to the other device. According to an implementation, new information is information stored in the mobile device 100 and/or vehicle device(s) 405 since the last synchronization of the mobile device 100 and vehicle device(s) 405. New information can include location information or any other information stored in the devices, such as contact information. A "resolve conflict in favor of" selection 616 is shown. When the "auto-update device or vehicle with new information" button 614 is enabled at least one of the "device" button 618 and "vehicle" button 620 are toggled to an active state. FIG. 6 shows the "device" button 618 as active. In an implementation, when conflicts occur between information stored in the mobile device 100 and vehicle device(s) 405, the "resolve conflict in favor of" selection 616 determines which device's information is copied onto the other device.

According to an implementation, when conflicts between data on the vehicle device(s) 405 and mobile device 100 occur, the user may be alerted. The user may be able to resolve the conflict in favor of either the vehicle device(s) 405 or mobile device 100 on an item by item basis, or based on a category of information (e.g., telephone numbers, calendar entries, etc.). This may be a hot sync feature of the device.

A "view advanced synchronization settings" button 622 is shown. According to an implementation, selection of this button 622 permits a user to configure advanced synchronization settings, including reconciliation settings when conflicts occur. For instance, a user may select, on an item by item basis, whether the mobile device 100 or vehicle device(s) 405 should govern in the event of a conflict. Items may be individually toggled, such as contacts, calendar entries, telephone numbers, destinations, points of interest, and the like. According to an implementation, selection of this button 622 permits a user to configure whether synchronization occurs on an item by item basis. Other advanced settings, such as a schedule or time for synchronization to occur (if not in real-time or in near real-time) may be established by a user.

Figure 7:
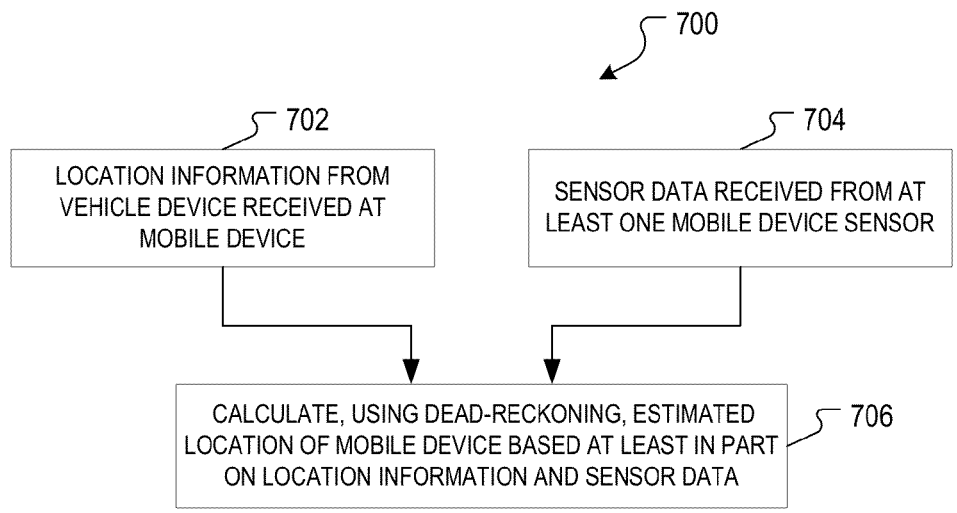
FIG. 7 is a flowchart of an example process for determining the location of a mobile device using information provided from a vehicle device.

FIG. 7 is a flowchart of an example process 700 for determining the location of a mobile device using information provided from a vehicle device. The process 700 can, for example, be implemented in a processing device, such as the mobile device 100 of FIG. 1, implementing user processing in software and/or hardware.

Location information stored in a memory of a vehicle device is received at a mobile device (702). For example, latitude and longitude information may be transmitted to the memory 350 of the mobile device from a GPS receiver located in an automobile. According to an implementation, the location information may be received via the other input/control devices 348 and/or via the wireless communication subsystem(s) 324.

Sensor data is received from at least one sensor of or associated with the mobile device (704). According to an implementation, one or more processors 304 of the mobile device can receive sensor data is received from one or all of the accelerometer 172, compass 173, and/or gyroscope 175. Using an on board clock, the processor(s) 304 can, for example, interpret the sensor data as movements of the device 100. Using acceleration data, for example, the processor(s) 304 can determine velocity, and position. Alternatively, or in addition, compass data can be used to determine a heading. In some implementations a number of steps and user stride information can be used to determine a distance walked.

Next, an estimated location of the mobile device is calculated based at least in part on the location information and the sensor data (706). According to an implementation, other software instructions 372 stored in the mobile device can utilize the location information provided by the vehicle device as a starting point for estimating the location of the mobile device, and the sensor data processed by the one or more processors 304 identify movements that are measured relative to the starting point to estimate a position using dead reckoning.

Figure 8:
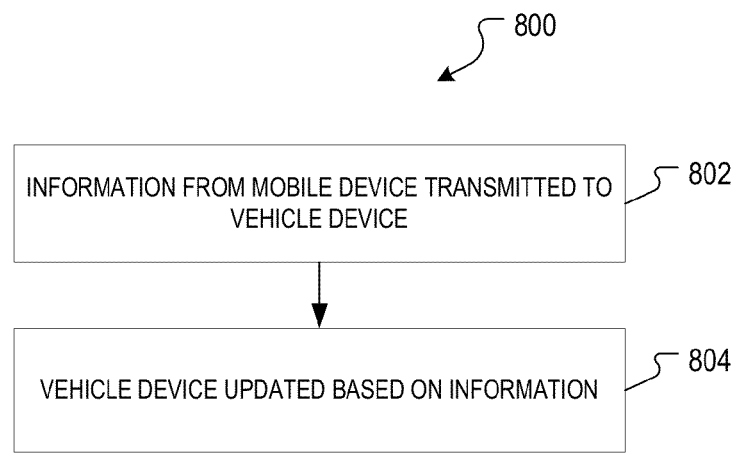
FIG. 8 is a flowchart of an example process for updating a vehicle device based on information provided by a mobile device.

FIG. 8 is a block diagram of an example process 800 of synchronizing a vehicle device and a mobile device. Information from a mobile device is transmitted to a vehicle device (802). According to an implementation, the information can include location information and/or other information identified and/or stored by the mobile device. For instance, the information transmitted to the vehicle device can include one or more telephone numbers, addresses, names, email addresses, the location of a desired destination, the location or identity of an object, navigation information (including routes), addresses, calendar entries, telephone numbers, destinations, configuration settings, historical route information, points of interest, and the like. The vehicle device is then updated based on the received information (804). According to an implementation, prior to updating the vehicle device, the vehicle device can compare the received information to stored information. According to an implementation, only new information received from the mobile device may be updated by the vehicle device.

Figure 9:
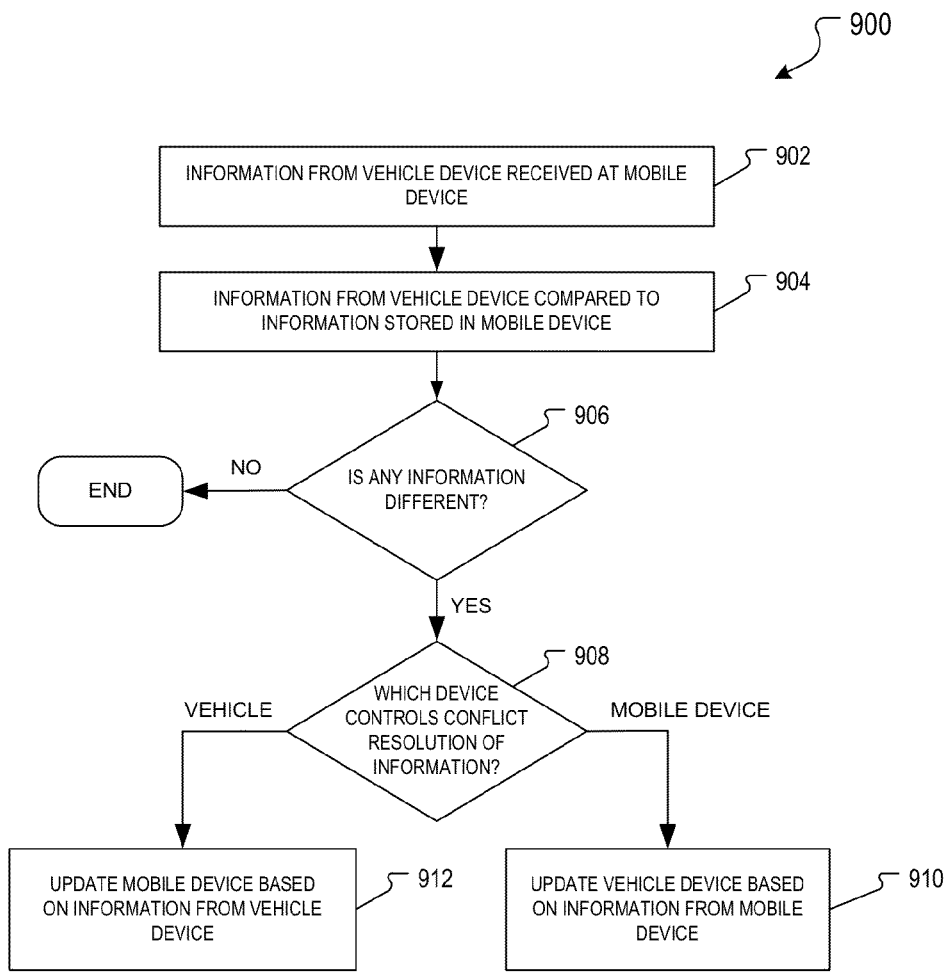
FIG. 9 is a flowchart of an example process for synchronizing a vehicle device and a mobile device.

FIG. 9 is a block diagram of an example process 900 of synchronizing a vehicle device and a mobile device. Information from a vehicle device is transmitted to a mobile device (902). According to an implementation, the information can include location information and/or other information identified and/or stored by the vehicle device. For instance, the information can include one or more telephone numbers, addresses, names, email addresses, the location of a desired destination, the location or identity of an object, navigation information (including routes), addresses, calendar entries, telephone numbers, destinations, configuration settings, historical route information, points of interest, and the like.

The information received from the vehicle device is compared to information stored in the mobile device (904). If no new information is identified, the synchronization process terminates (906). According to an implementation, the process may restart immediately. If any information is different (906), the device that controls conflict resolution is identified (908). According to an implementation, this may be set by a user via synchronization settings, as described with respect to FIG. 6. If the vehicle device controls conflict resolution, the mobile device is updated (912). Alternatively, if the mobile device controls conflict resolution, the vehicle device is updated (910). According to an implementation, the updating may be performed by other software instructions 372 stored within a memory 350 of the mobile device.

Although reference is made herein to communication (including synchronization) between the mobile device and a vehicle device, other device types may take the place of the vehicle device in the present disclosure. For example, the mobile device may communicate with another mobile device, such as a like mobile device or another a handheld device such as a computer, PDA, GPS device, telephone, or the like. Thus, the mobile device may synchronize and/or obtain information from another mobile device using the methods and systems described herein.

The foregoing descriptions of implementations of the present disclosure are presented for purposes of illustration and description. They are not intended to be exhaustive or to limit the invention to the precise forms disclosed. Rather, it should be appreciated that many modifications and variations are possible in view of the above teachings. The implementations were chosen and described in order to best explain the principles of the disclosure and its practical applications, to thereby enable others skilled in the art to best utilize the invention and various implementations with various modifications as are suited to the particular use contemplated.

What is claimed is:

1. A method, comprising:
   establishing, by a mobile device, communication between the mobile device and a vehicle device;
   after establishing the communication and by the mobile device, providing for display on the mobile device a synchronization control user interface item and a dead reckoning user interface item, wherein:
      the synchronization control user interface item is operable to receive a user input for determining a location of the mobile device using a location determination system of the vehicle device;
      the dead reckoning user interface item is operable to receive a user input for determining the location of the mobile device using dead reckoning; and
      the synchronization control user interface item, when selected, causes the dead reckoning user interface item to be deactivated; and
   determining the location of the mobile device according to the user input received through the synchronization control user interface item or the user input received through the dead reckoning user interface item.

2. The method of claim 1, comprising:
   providing for display a dead reckoning mode selection user interface item, the dead reckoning mode selection user interface item configured to be activated when the dead reckoning user interface item is active, wherein the dead reckoning mode selection user interface item is operable to receive a user selection of a walking mode or a vehicle mode, wherein:
      in the walking mode, the mobile device detects periodic acceleration and uses the periodic acceleration in dead reckoning calculations; and
      in the vehicle mode, the mobile device discounts acceleration in a positive or negative direction along an axis of the Earth's gravity in dead reckoning calculations.

3. The method of claim 2, wherein the dead reckoning mode selection user interface item comprises a first virtual button corresponding to the walking mode, and a second virtual button corresponding to the vehicle mode.

4. The method of claim 1, comprising:
   providing for display a conflict resolution user interface item.

5. The method of claim 1, comprising:
   providing for display a dead reckoning enabling user interface item, the dead reckoning enabling user interface item, when activated, being operable to cause the mobile device to switch, when the communication ceases, from determining the location of the mobile device using the location determination system of the vehicle device to determining the location of the mobile device using dead reckoning.

6. The method of claim 1, comprising:
   providing for display an update user interface item configured to receive an input for automatically updating the mobile device or the vehicle device.

7. A system, comprising:
   a mobile device;
   a non-transitory computer-readable medium storing instructions operable to cause the mobile device to perform operations comprising:
      establishing, by the mobile device, communication between the mobile device and a vehicle device;
      after establishing the communication and by the mobile device, providing for display on the mobile device a synchronization control user interface item and a dead reckoning user interface item, wherein:
         the synchronization control user interface item is operable to receive a user input for determining a location of the mobile device using a location determination system of the vehicle device;
         the dead reckoning user interface item is operable to receive a user input for determining the location of the mobile device using dead reckoning; and
         the synchronization control user interface item, when selected, causes the dead reckoning user interface item to be deactivated; and
      determining the location of the mobile device according to the user input received through the synchronization control user interface item or the user input received through the dead reckoning user interface item.

8. The system of claim 7, the operations comprising:
   providing for display a dead reckoning mode selection user interface item, the dead reckoning mode selection user interface item configured to be activated when the dead reckoning user interface item is active, wherein the dead reckoning mode selection user interface item is operable to receive a user selection of a walking mode or a vehicle mode, wherein:
      in the walking mode, the mobile device detects periodic acceleration and uses the periodic acceleration in dead reckoning calculations; and
      in the vehicle mode, the mobile device discounts acceleration in a positive or negative direction along an axis of the Earth's gravity in dead reckoning calculations.

9. The system of claim 8, wherein the dead reckoning mode selection user interface item comprises a first virtual button corresponding to the walking mode, and a second virtual button corresponding to the vehicle mode.

10. The system of claim 7, the operations comprising: providing for display a conflict resolution user interface item.

11. The system of claim 7, the operations comprising: providing for display a dead reckoning enabling user interface item, the dead reckoning enabling user interface item, when activated, being operable to cause the mobile device to switch, when the communication ceases, from determining the location of the mobile device using the location determination system of the vehicle device to determining the location of the mobile device using dead reckoning.

12. The system of claim 7, the operations comprising: providing for display an update user interface item configured to receive an input for automatically updating the mobile device or the vehicle device.

13. A non-transitory computer-readable medium storing instructions operable to cause a mobile device to perform operations comprising:
   establishing, by the mobile device, communication between the mobile device and a vehicle device;
   after establishing the communication and by the mobile device, providing for display on the mobile device a synchronization control user interface item and a dead reckoning user interface item, wherein:
      the synchronization control user interface item is operable to receive a user input for determining a location of the mobile device using a location determination system of the vehicle device;
      the dead reckoning user interface item is operable to receive a user input for determining the location of the mobile device using dead reckoning; and
      the synchronization control user interface item, when selected, causes the dead reckoning user interface item to be deactivated; and
   determining the location of the mobile device according to the user input received through the synchronization control user interface item or the user input received through the dead reckoning user interface item.

14. The non-transitory computer-readable medium of claim 13, the operations comprising:
   providing for display a dead reckoning mode selection user interface item, the dead reckoning mode selection user interface item configured to be activated when the dead reckoning user interface item is active, wherein the dead reckoning mode selection user interface item is operable to receive a user selection of a walking mode or a vehicle mode, wherein:
      in the walking mode, the mobile device detects periodic acceleration and uses the periodic acceleration in dead reckoning calculations; and
      in the vehicle mode, the mobile device discounts acceleration in a positive or negative direction along an axis of the Earth's gravity in dead reckoning calculations.

15. The non-transitory computer-readable medium of claim 14, wherein the dead reckoning mode selection user interface item comprises a first virtual button corresponding to the walking mode, and a second virtual button corresponding to the vehicle mode.

16. The non-transitory computer-readable medium of claim 13, the operations comprising:
   providing for display a conflict resolution user interface item.

17. The non-transitory computer-readable medium of claim 13, the operations comprising:
   providing for display a dead reckoning enabling user interface item, the dead reckoning enabling user interface item, when activated, being operable to cause the mobile device to switch, when the communication ceases, from determining the location of the mobile device using the location determination system of the vehicle device to determining the location of the mobile device using dead reckoning.

18. The non-transitory computer-readable medium of claim 13, the operations comprising:
   providing for display an update user interface item configured to receive an input for automatically updating the mobile device or the vehicle device.

\* \* \* \* \*